United States Patent
Chan et al.

(10) Patent No.: US 7,861,195 B2
(45) Date of Patent: Dec. 28, 2010

(54) PROCESS FOR DESIGN OF SEMICONDUCTOR CIRCUITS

(75) Inventors: Darin A. Chan, Santa Clara, CA (US);
Yi Zou, Sunnyvale, CA (US);
Yuansheng Ma, Santa Clara, CA (US);
Marilyn Wright, Sunnyvale, CA (US);
Mark Michael, Cedar Park, TX (US);
Donna Michael, legal representative, Cedar Park, TX (US)

(73) Assignee: Advanced Mirco Devices, Inc., Sunnyvale, CA (US)

( * ) Notice: Subject to any disclaimer, the term of this patent is extended or adjusted under 35 U.S.C. 154(b) by 337 days.

(21) Appl. No.: 12/022,860

(22) Filed: Jan. 30, 2008

(65) Prior Publication Data
US 2009/0193369 A1      Jul. 30, 2009

(51) Int. Cl.
*G06F 17/50* (2006.01)

(52) U.S. Cl. ............... 716/4; 716/5; 716/19; 716/20; 716/21; 430/5; 430/30

(58) Field of Classification Search ................ 716/4, 716/5, 19–21; 430/5, 30
See application file for complete search history.

(56) References Cited

U.S. PATENT DOCUMENTS

| 7,448,018 | B2* | 11/2008 | Heng et al. | .................. 716/21 |
| 2004/0210863 | A1* | 10/2004 | Culp et al. | .................. 716/21 |
| 2004/0261044 | A1* | 12/2004 | Yonezawa | .................. 716/4 |
| 2005/0251771 | A1* | 11/2005 | Robles | .................. 716/5 |
| 2008/0071511 | A1* | 3/2008 | Lin | .................. 703/14 |

* cited by examiner

*Primary Examiner*—Thuan Do
*Assistant Examiner*—Nha T Nguyen
(74) *Attorney, Agent, or Firm*—Ditthavong Mori & Steiner, P.C.

(57) ABSTRACT

The present invention generates model scenarios of semiconductor chip design and uses interpolation and Monte Carlo, with random number generation inputs, techniques to iteratively assess the models for a more comprehensive and accurate assessment of design space, and evaluation under projected manufacturing conditions. This evaluation information is then incorporated into design rules in order to improve yield.

7 Claims, 10 Drawing Sheets

DRAWN

FIG. 1A

SIMPLE CONTOUR

FIG. 1B

ENHANCED CONTOUR

PROCESS FOR DESIGN OF SEMICONDUCTOR CIRCUITS

TECHNICAL FIELD

The present invention is directed to the design of semiconductor chips. In particular, the present invention allows for a more comprehensive and accurate assessment of design space.

BACKGROUND

Semiconductor circuit manufacturing is subject to certain design rules for laying out features on wafers. As semiconductor circuits become more highly integrated, it is important to design semiconductor chips in such a manner as to provide more elements on a chip for a higher yield in the final product. It is desirable to bring process technology smoothly through development in order to manufacture the product with a competitive yield and efficient die size positioning.

Conventional solutions generally utilize very simple models based on sweeping assumptions about the shape of features on a processed semiconductor wafer. Such models and assumptions result in inaccuracies, leading to less than optimal design rules.

Traditionally, a one-dimensional analysis is used, taking into account critical dimension (CD) tolerances and polysilicon gate levels for making an overlay. Lithographic analysis methods have evolved into two-dimensional shaping techniques that take into account anomalies in simple geometric shapes, such as corner rounding and the like. A simple model of conventional systems may assume all contacts drawn at the same square dimension S×S translate to circular features on the wafer with a nominal radius, e.g., r, with a normal Δr distribution around 0, with sigma of 5 nm. 90° sharp corners as drawn, result in rounded corners on wafer, with the simple model treating this as a semicircular arc. Errors associated with using simplistic shapes can be a few to tens of nm. This is an appreciable fraction of the target CD in semiconductor technology that involves sub-100 nm dimensions.

Thus, to obtain even higher yields and more optimal die pattern edge positioning and mask design, there is a need for a more sophisticated approach to the design process. More advanced modeling and predictive software is required to calculate accurate metrics for more complex feature shapes than the simple geometric shapes currently analyzed, thereby to obtain a truer representation of actual manufactured shapes of the semiconductor chip features.

BRIEF DESCRIPTION OF THE DRAWINGS

FIG. 3A-1 is a chart of process variability band (PVBAND) contours for simulation.

FIG. 3A-2 is a more detailed look at a portion of the chart of FIG. 3A-1

FIG. 3B-1 is a chart of normal vectors along an outer edge of polysilicon contours.

FIG. 3B-2 is a chart of normal vectors along an inner edge of polysilicon contours.

FIG. 3C-1 is a diagram of interpolation between contours for determining the distance between nominal and inner edges.

FIG. 3C-2 is a diagram of a comparison between PVBAND and interpolated contours.

DESCRIPTION OF THE PREFERRED EMBODIMENTS

A more comprehensive and accurate assessment of design space permits rigorous evaluation under projected manufacturing conditions. This evaluation information is incorporated into optimized design rules that would otherwise result in degraded yield or would require more wafer area for the same yield without degradation. Time-to-market will thus be improved, since fewer problems will arise during development and/or prototyping.

A design rule is the constraint on design shape relationships, or layout, in circuit design for semiconductor manufacturing. A construct is created to draw polygon shapes representative of different areas on the chip. A photomask is then made in accordance with the construct for forming the features during manufacture of the chip. Limits are determined that bound the physical nature of features on the wafer so that the corresponding electrical behavior is within a manufacturing window of high probability to achieve good product yields. Derivation of appropriate constraints involves compiling assumptions in regard to nominal shapes on the wafer and the anticipated variation in dimension of those shapes across normal manufacturing conditions. The spatial relationship of different shapes to one another is important to project effects of overlay, or relative shifting of features on the wafer relative to designed or drawn shapes. Typical constraints might include, for example, width of shapes, separation distance between shapes, enclosure of a shape by another shape, and the intersection area of shapes, as perceived to represent a physical manifestation of the corresponding features on the wafer.

Relatively simple representations can be utilized to associate line width or spacing variation with a nominal value and a +/-three or four-sigma min/max value. Under these assumptions, one can perform a Monte Carlo simulation to generate a probability distribution for the parameter of interest, such as width, spacing, enclosure, intersection, etc. Design limits can be chosen based on an acceptable "failure" rate.

For more complex geometric configurations, more sophisticated and accurate shapes of the on-wafer features are derived by the design rule formation methodology. Topographical Design Rules (TDRs) are used to generate the physical layout of the circuits on a semiconductor chip. TDRs are established in order to ensure a base line yield, meet a reliability criterion, and achieve a competitive die size. TDRs, as with other rules, are restrictive by nature, i.e., they restrict what is allowed by design as, for example, setting a minimum/maximum space/width/area, and setting a minimum enclosure or space between layers. Any geometry that is not restricted by the TDRS may be expected to occur, and therefore be present in the design. TDRs do not exist in isolation. Their interaction must be understood when TDRs are created and/or modified. For example, with a constant gate pitch, most FEOL rules must act in comity with each other. FEOL refers to front-end-of-the-line, denoting the first portion of integrated circuit fabrication where the individual devices (transistors, resistors, etc.) are patterned in the semiconductor, and generally covering everything up to, but not including, the deposition of metal layers. Certain rules must sum to values consistent with gate pitch. There are various phases of TDR development, which will be explained below, in conjunction with FIG. 2.

The use of photolithography simulation and a calibrated model can provide a much better representation of what the final wafer will really look like. These can reflect skewed CD, e.g., width/space, distributions and/or systematic offsets in nominal CD between, e.g., dense and isolated contacts. The process may be mimicked with a multi-step shape evolution, whereby the projected photolithographic shape is derived first and subsequent transformations can then be applied such as a model for post-etch transformation that might involve variability in slope and feature height. The photolithographic simulator would have certain key input conditions such as exposure, focus, mask error, etc. conditions.

More accurate shape inputs may also be derived from empirical SFM images. Processing wafers with various "corner" conditions can also provide material to derive the "min/max" contours useful for Monte Carlo simulation input.

The patterns on the chip and the alignment between patterns may be varied. A cumulative density function (CDF) is obtained and a random number is correlated with an offset CD. An envelope is achieved that is within the present guidelines for the chip. A distributed function, e.g., 6-sigma, is then obtained and this is compared with predefined or user-specified limits. A good/bad determination is made. Smaller variation relative to the limits yields better results. Thus, the predictive process contour is generated by random number generation using distributions representative of physical processing that may or may not be normal in nature.

Figure 1A:
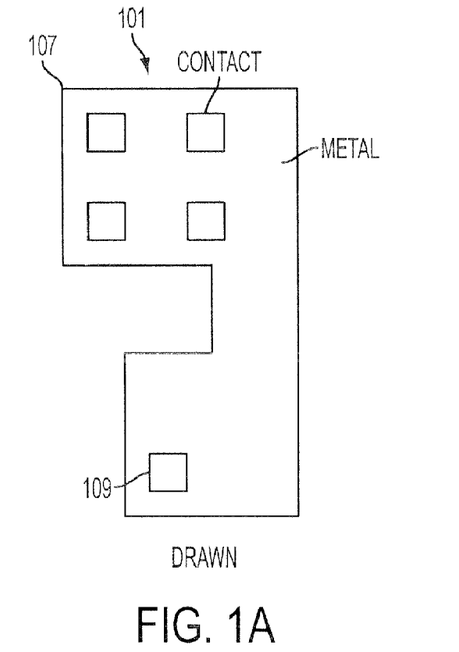
FIGS. 1A-1C are diagrams of on-wafer plan view features with various corner conditions represented.
Figure 1B:
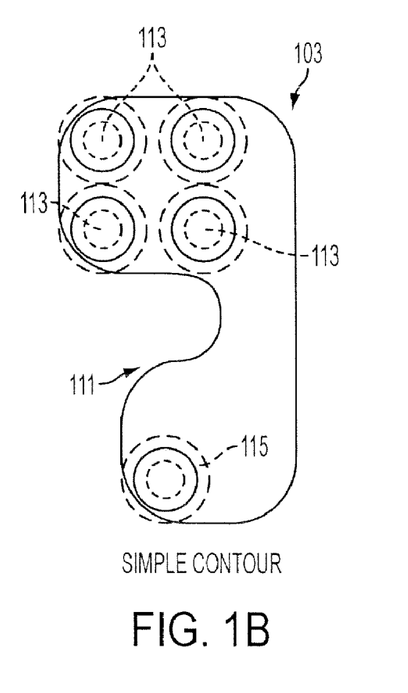
Figure 1C:
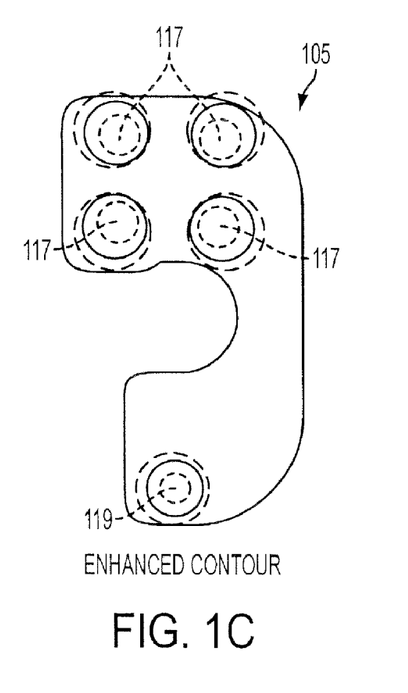

FIG. 1A-1C depict wafer patterns with various corner conditions. FIG. 1A depicts a nominal drawing of a wafer pattern 101, showing ideally sharp corners 107 both on the wafer 101 and on the various contacts 109. In reality, the manufacture of a highly integrated circuit will not produce such sharp corners.

In the wafer pattern depicted in FIG. 1B, a simple contour 103, with rounded edges 111, is shown that approximates the configuration comparable to the nominal drawing of FIG. 1A. The rounded edges 111 have a constant radius that may be a good approximation of an enhanced contour obtained in the manufacturing process. Circular contacts 113 and 115 are reflected by three contours that may result from manufacturing processes, with relatively even spacing therebetween. This idealized contour variation may not actually be achieved due to the realities of wafer processing and their non-linear geometric sensitivity. FIG. 1C depicts an enhanced contour wafer pattern 105 with contacts 117 and isolated contact 119. The isolated contact 119 is smaller in size than the array of contacts 117. Also, in this enhanced contour, the contours are not equidistant in order to show asymmetry/skew of the CD distribution towards the smaller side. In FIG. 1C, only the nominal metal contour is illustrated. The curvature of the periphery corners differs from the simple regular curvature contour of FIG. 1B.

Resistance of contact points 117 and 119 is important as this may be a proxy for electrical behavior of the circuit and correlated to the intersection area of contact and under- and/or over-layer pattern. Restraints can be placed on these contacts by running a statistical Monte Carlo algorithm, varying patterns and alignment between patterns, obtaining a cumulative density function and making sure the resulting envelope of the intersecting area is within the guidelines, or design rules.

Simulation of a circuit design to generate high fidelity contours can be time consuming and memory intensive. Such simulation would require repeated generation of print image contour data, adjustment of lithographic parameters, and storage of the data in memory. As a trade-off approach, a combination of PVBAND analysis and interpolation process are undertaken, whereby a Monte Carlo distribution is constructed for 3-sigma and 4-sigma corner cases, for example, and a random number of inputs are generated for iteratively running the Monte Carlo simulation until a satisfactory result, within rule guidelines, is achieved.

Figure 2:
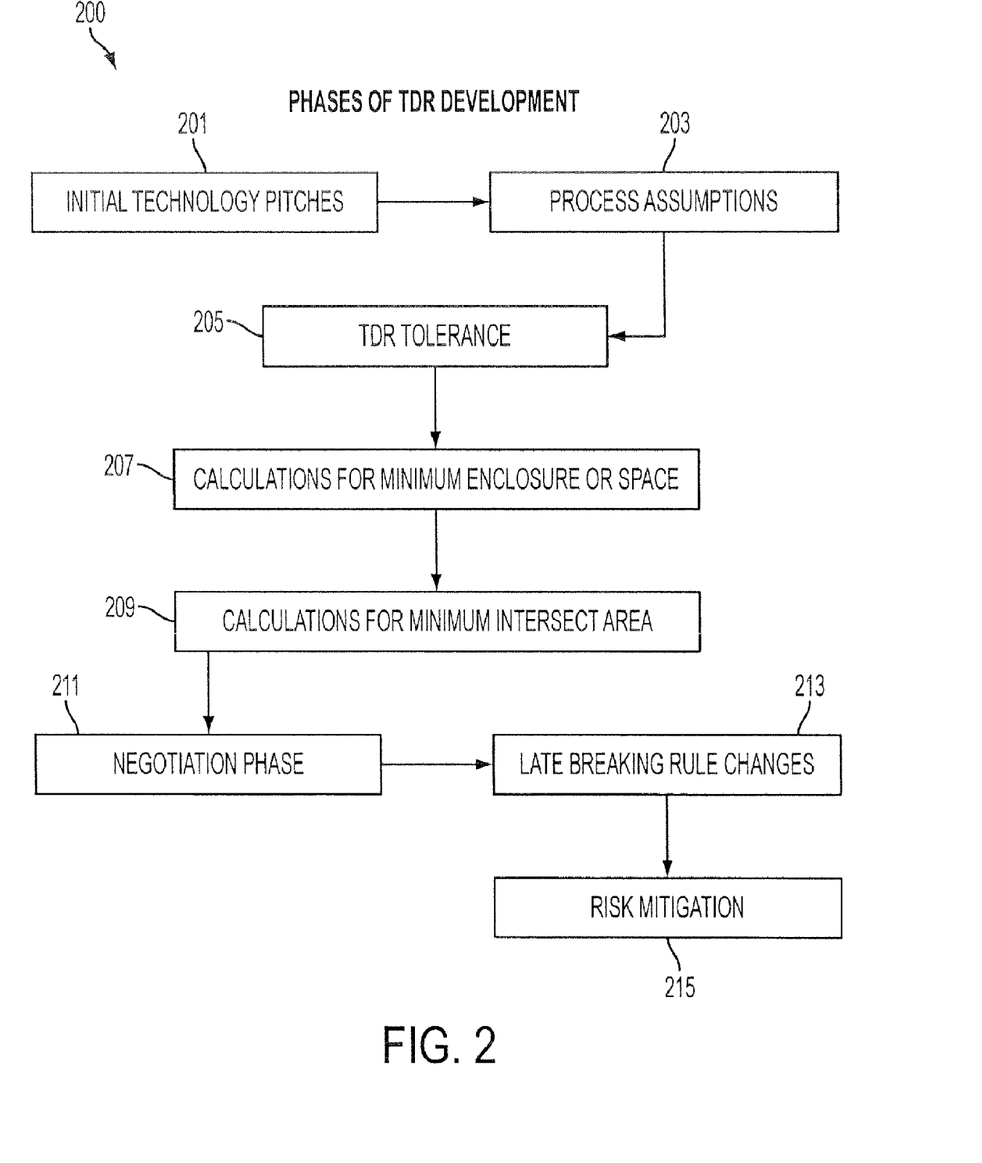
FIG. 2 is a flowchart of the phases of topographical design rule (TDR) development.

FIG. 2 is a flowchart 200 of the phases of TDR development.

At step 201, the critical layer minimum pitches, i.e., initial technology pitches, are set. Various layers and metal vias are laid out using design, integration, and process development, mostly lithographically. Pitches are set and a decision is made on width vs. space. For metal levels, the pitch is usually equally split between the width and space. Other levels may split the pitch differently, e.g., with space larger than width. Not all rules need scale at the same factor but, for simplicity of explanation, it may be assumed that the configuration is scaled at the same factor.

At step 203, certain assumptions are made about the lithographic process by integration and process development teams. These assumptions become a key element in constructing the set Of rules that will govern circuit layout. The process assumption tolerances are generally expressed as a 3 sigma value. The types of assumptions are dependent on layer. The alignment sequence and the associated overlays are also specified.

While tolerances in the process assumptions are given, for example, as 3 sigma values, determination is made for TDR tolerance at step 205. A 3 sigma analysis indicates 135 failures in 100,000 samples while a 4 sigma analysis indicates 3 fails in 100,000 samples. It is preferable to employ 4 sigma TDR calculations to ensure manufacturing margins for high yield.

Step 207 relates to calculations for guaranteeing a minimum enclosure or space. Stated mathematically, Design Rule=Margin+/−Bias+(n-Sigma)*RSS(PA Tolerances), wherein:

Design Rule is a calculated nominal design rule;

Margin is a guaranteed minimum overlap/space;

Bias is a nominal per edge feature bias for each layer involved;

n-Sigma is a 3× or 4× value used for TDR determination;

RSS is the square root of the sum of the squares; and

PA Tolerances are tolerances for the layer involved, CDs, overlays.

Calculations for a minimum intersect area are undertaken at step 209. For some rules, the criterion is to have a minimum quarantined intersect area, e.g., contact landed on active or polysilicon, and via landed on metal below. The general criterion is 40% to 50% of a fully landed nominal contact/via. Contacts or vias are permitted to be only partially landed. Since this is not a minimum space or overlap, the equation approach, indicated above, is not appropriate. Rather, these rules are examined through a Monte Carlo approach wherein process assumptions for the nominal drawn to final CD offset, CD side and line end tolerances or variability, corner radius, and overlay are examined with all tolerances varied as a Gaussian distribution.

As commonly understood, a Monte Carlo approach is a method for iteratively evaluating a deterministic model using sets of random numbers as inputs. Once the needed number of trials is run, the key points of the final distribution are reported. For 3-sigma, the cumulative distribution point is 0.00135. For 4-sigma, the cumulative distribution point is 0.00003. Note that a 3-sigma point is often referenced here rather than the more traditional 6-sigma, because in many cases failure occurs only on one tail of the distribution, e.g., it is undesirable to have too high a resistance but there can never be too low a resistance.

In a Negotiation Phase, at step 211, a designer will determine if some rule or rules can be made less restrictive, or removed altogether. This would occur sometime after the TDRs are starting to be defined. Any such change is evaluated and a final answer is negotiated between LTD and Design and Fabrication if necessary. A rule may be changed for various reasons, including, for example, recent data suggesting that the margin value may be decreased, recent data suggesting that some process assumption value may be decreased, or additional rules that refine the restriction to allow some geometries at a smaller dimension.

At step 213, determination is made as to whether there are late breaking rule changes. Late in the technology development a need may become clear to increase the value of a rule, i.e., make it more restrictive, or add a new rule. This realization may come from test chips or even from the initial design in fabrication. Such late breaking rule changes differ from TDR Negotiation since at this point there is usually a significant amount of design work already completed. There are several options to be considered when it is desired to make a late rule change. Design makes any layout changes based on the new rule. In general, this is acceptable only if the change is small and there is a significant amount of time until tapeout. This may also be acceptable if the change does not cause any cell to grow in any dimension. If the design change cannot be made without a significant impact to design or schedule, fabrication/technology considerations must address this issue and/or perhaps accept a reduced yield. A compromise may be reached in which the current design will not implement the new rule but later versions will. This option may be acceptable as the need for a new rule is usually found no later than early lots on the initial design and the production design version can usually incorporate the rule change.

Risk mitigation is undertaken at step 215. With the very aggressive process development and product design cycles, there is a desire to validate the process assumptions and TDRs as early as possible. Validation is made more difficult by the fact that some process enabling tools are sometimes unavailable until late in the process development cycle. For risk mitigation, Integration, Fabrication and Design teams review all rules with regard to the impact on design and the possibility of making changes. The key rules are reviewed in detail and risk mitigation is considered for all rules. This may include an increase in rules in order to reduce risk and a consideration on the impact on the final product if a rule is not met.

Figure 3A:
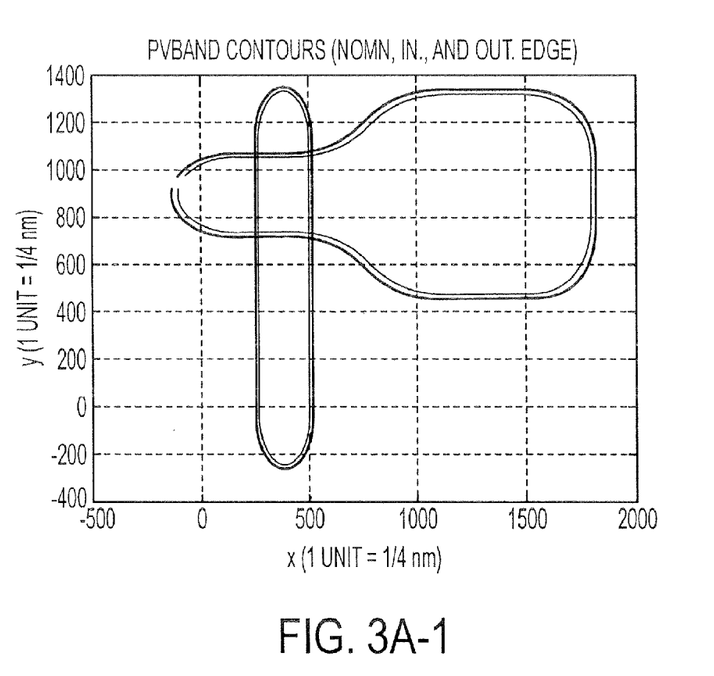
Figure 3A:
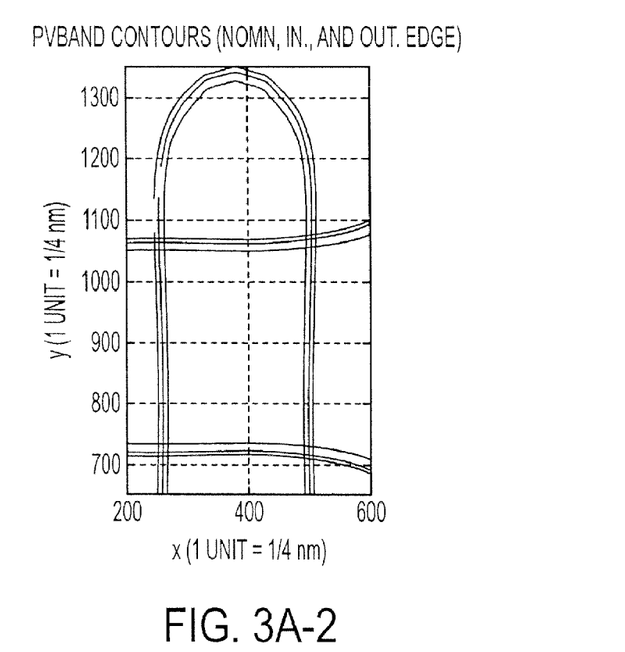

FIGS. 3A-1 and 3A-2 illustrate the use of process variability band (PVBAND) Simulation in obtaining contours. It is desired to analyze IC layouts and designs by calculating variations of a number of objects to be created on a semiconductor wafer as a result of different process conditions. The variations are analyzed to determine individual feature failures or to rank layout designs by their susceptibility to process variations. In a preferred embodiment, the variations are represented by PV-bands having an inner edge that defines the smallest area in which an object will always print and an outer edge that defines the largest area in which an object will print under some process conditions. A PV-band may be thought of as a geometry describing how the edges of a contour will respond to a process variation. As depicted in FIG. 3A-1, three PVBAND contours on active and poly layers of a semiconductor were obtained from a PVBAND simulation for each structure on the wafer. The three contours shown are a nominal edge, an inner edge, and an outer edge. In this analysis, it is assumed that the nominal edge corresponds to a CDF of 0.5, and the inner and outer edges to −/+3-sigma (CDF=0.00135 and 0.99865), but this parameter may be changed at any time in the program used for analysis. FIG. 3A-2 is a more detailed, zoomed-in, view of a portion of the PVBAND contours of FIG. 3A-1.

Figure 3B:
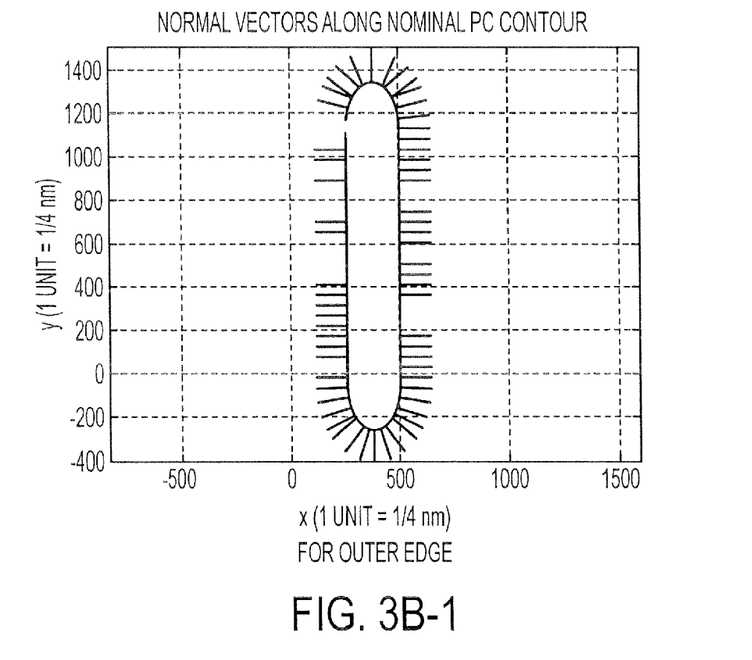
Figure 3B:
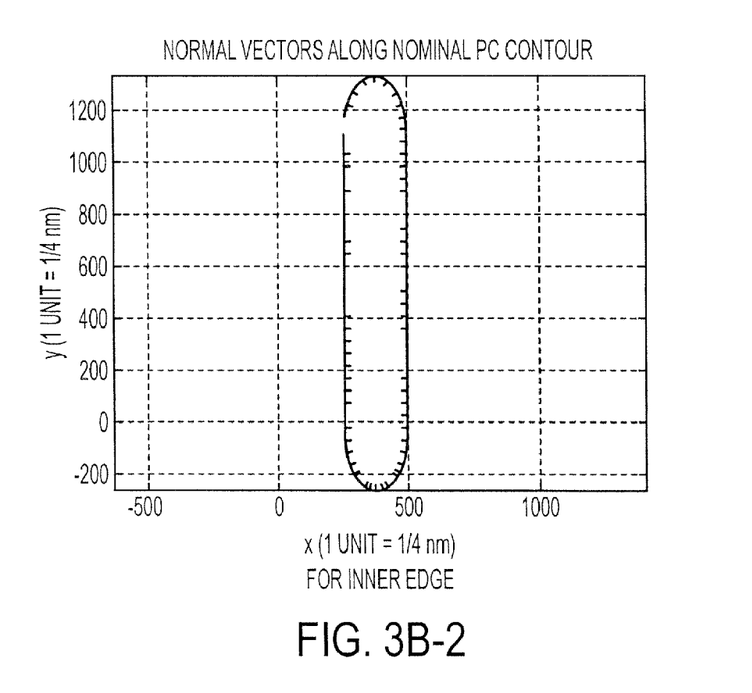

As depicted in FIGS. 3B-1 and 3B-2, in order to interpolate between contours, initially, normal vectors are drawn at discrete points along the nominal contours. FIG. 3B-1 depicts normal vectors along the nominal poly contour for an outer edge of the contour, while FIG. 3B-2 depicts normal vectors along the nominal poly contour for an inner edge of the contour. Then, as depicted in FIGS. 3B-1 and 3B-2, respectively, the outer and inner PVBAND contours are used to determine the distance between nominal and inner/outer edges along the nominal vectors.

Figure 3C:
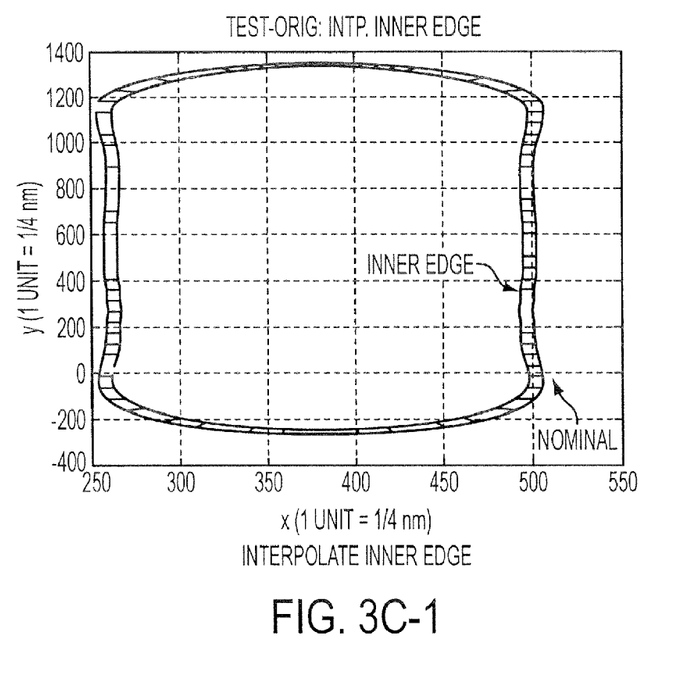
Figure 3C:
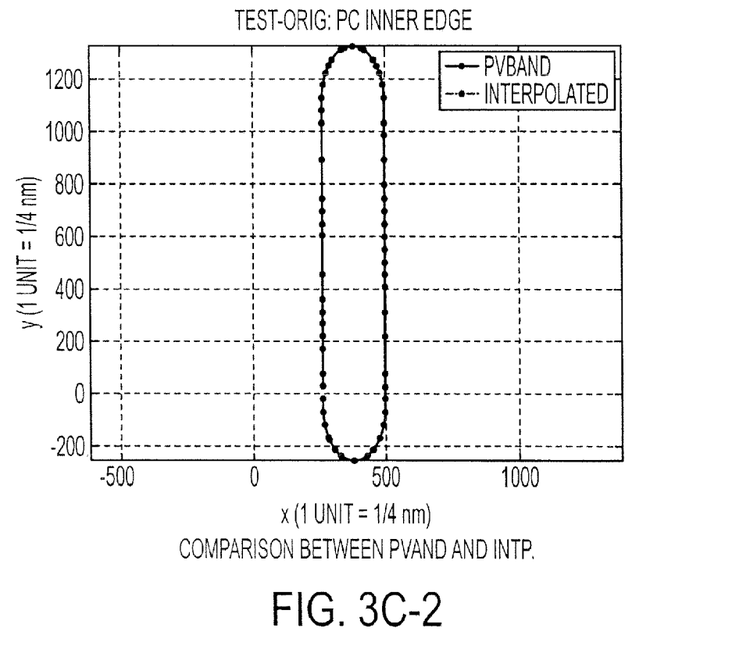

FIGS. 3C-1 and 3C-2 depict an interpolation between contours for determining the distance between nominal and inner/outer edges. FIG. 3C-1 depicts an interpolation for the inner edge of the contour, while FIG. 3C-2 depicts a comparison between actual PVBANT) and the interpolated values demonstrating excellent matching. Inner and outer edge positions may be used to determine the distance between nominal and inner/outer edges along the nominal vectors.

Figure 3D:
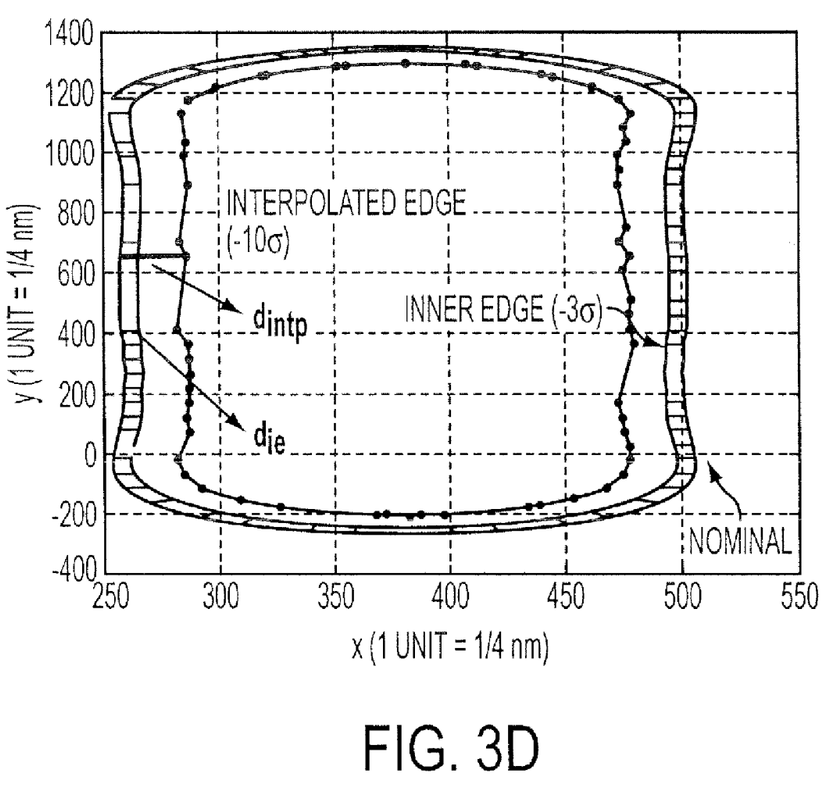
FIGS. 3D, 3E 3F are diagrams of interpolation between contours.
Figure 3E:
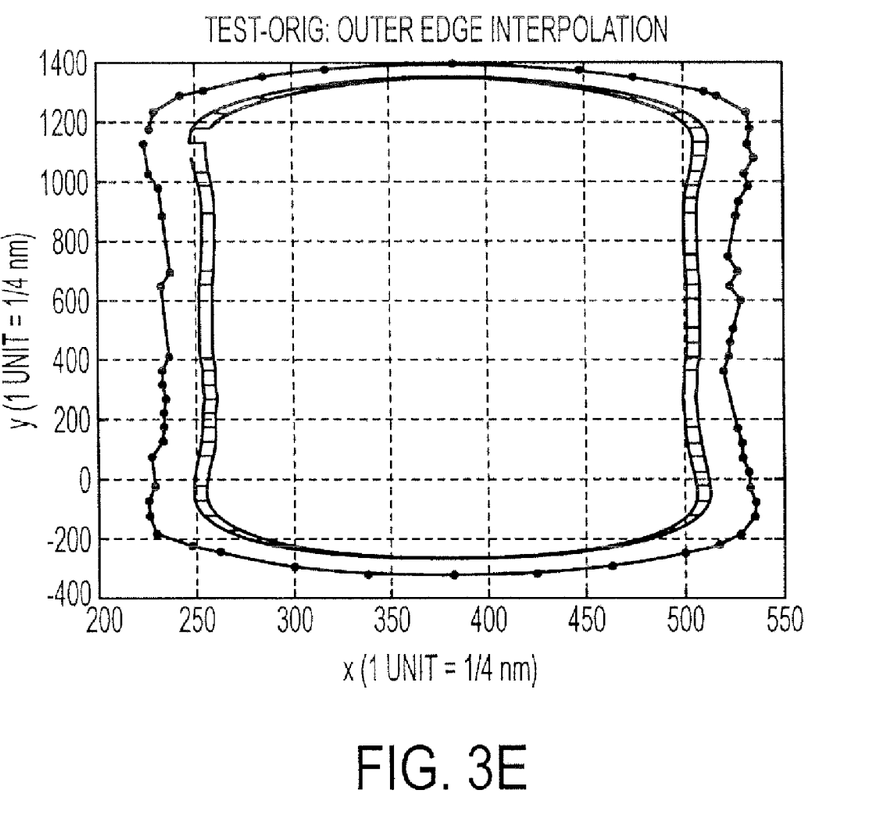

FIG. 3D depicts an interpolation between contours to obtain edges within an acceptable possibility. When the cumulative possibility density is less than 0.5, the interpolation is implemented between inner and nominal edges. FIG. 3E depicts an interpolation between contours regarding the outer edges, using the same methodology as above but with cumulative possibility density greater than 0.5.

Figure 3F:
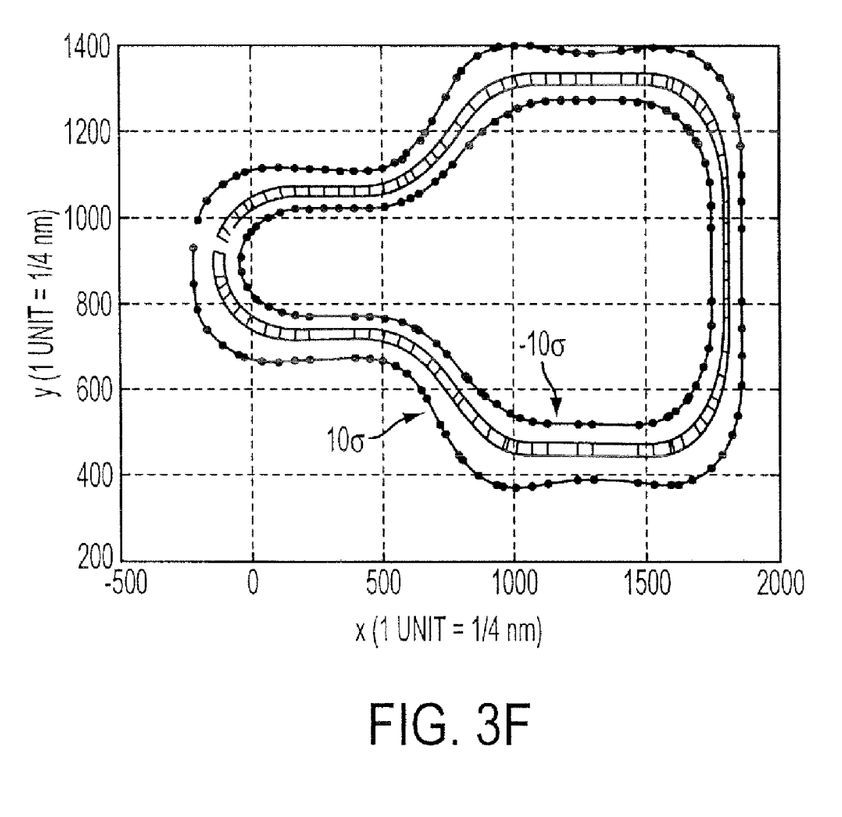

FIG. 3F depicts an interpolation for active demo using the same methodology as described for poly in the preceding paragraphs.

Figure 3G:
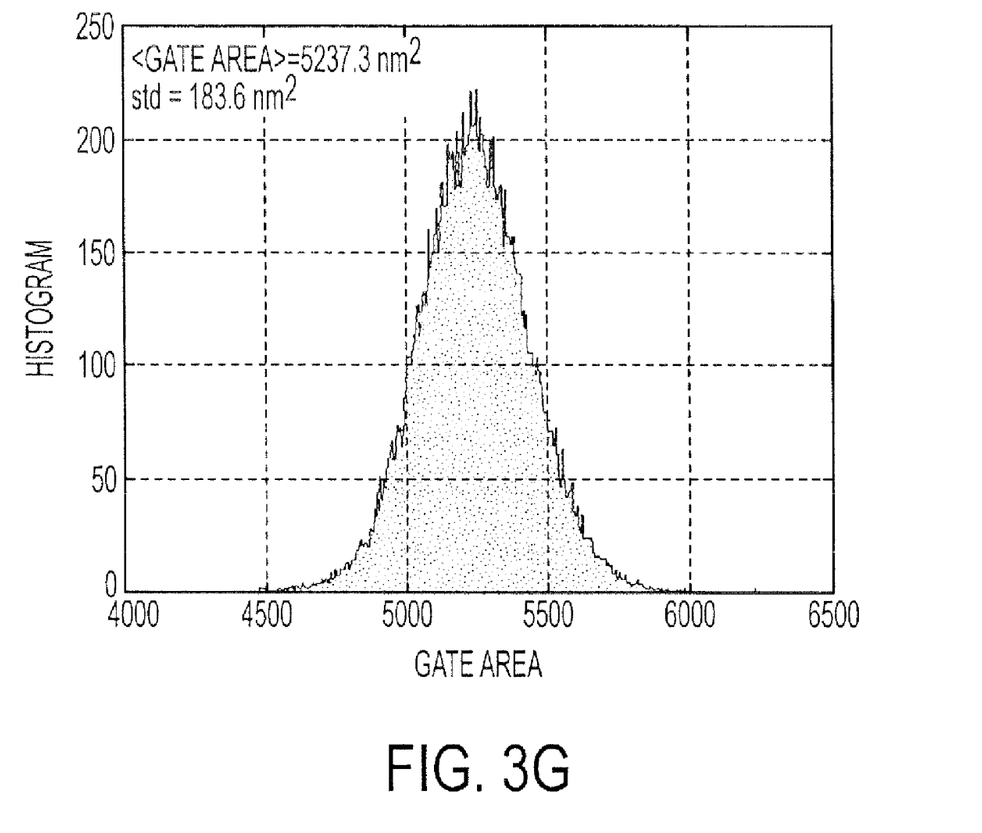
FIG. 3G is a histogram for PVBAND simulation.

FIG. 3G depicts a histogram relative to a gate area and 50,000 trials with a PC to RX Overlay (3-sigma)=12 nm.

The PVBAND simulation results can be used directly for checking and/or setting up design rules. With three given contours, nominal, inner, and outer edges, from PVBAND, and the assumed possibilities for each edge, any contours corresponding to different possibilities (different defocus and doses) can be derived by interpolating the given contours. The inventive process employs an algorithm whose robustness is improved by running more and more different cases. The accuracy of the method depends on the assumed possibility for each given contour, the number of contours for each structure, and the accuracy of the PVBAND simulation. The method can be extended to include any contour generated, e.g., SEM image contours, and artisan will recognize that the inventive method is not limited to PVBAND.

Figure 4:
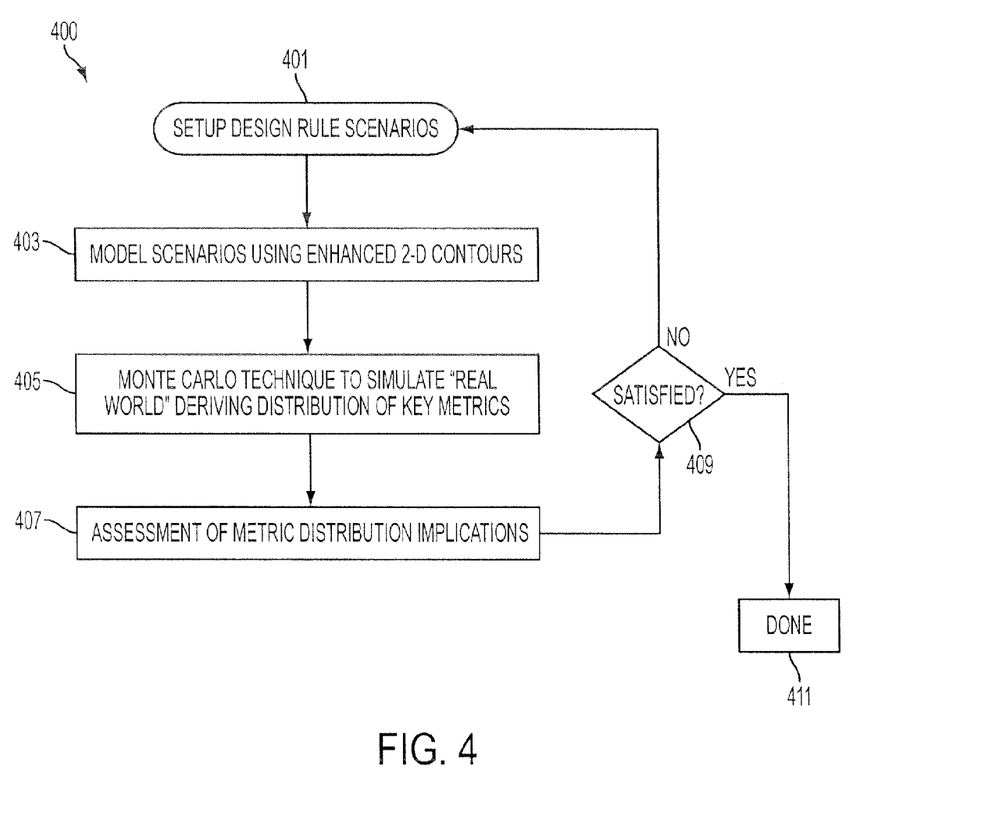
FIG. 4 is a flowchart of the steps of a Monte Carlo Simulation for process contours.

FIG. 4 is a flowchart depicting a Monte Carlo simulation for process contours.

At step 401, design rule scenarios are set up in accordance with TDR development as described above. At step 403, different scenarios that might occur, using the design rules, are modeled, using enhanced or sophisticated two-dimensional contours. At step 405, a Monte Carlo technique is employed in order to simulate what will take place in the "real world." This is accomplished by using many different sets of random numbers as inputs. The model achieved at step 403 is iteratively evaluated using this Monte Carlo approach. Once the needed number of trials is run, a distribution of key metrics is derived. The metric distribution is then assessed at step 407 to determine what the implications are on the final design from the derived distribution. If the designer is satisfied, at step 409, with those implications, and none of the design rules has been violated, then the process ends at step 411. However, if the designer is not satisfied with the implications of the derived distribution, then the process returns to step 401 for a new designation of rules, and the process repeats with the new rules. After this iterative process has been completed, manufacture of semiconductor chips at competitive yields and die size positioning is accomplished. Because a more comprehensive and accurate assessment of design space is able to be evaluated under projected manufacturing conditions, and this information is incorporated into more realistic design rules, the better yields and die size positioning are accomplished, leading to a reduced time to market since fewer problems are likely to arise during development and prototyping.

The enhanced accuracy is achieved by modeling at step 403, so that transformation or drawn and designed shapes of elements are more realistically akin to the shapes of the elements on-wafer. Simulation may be performed by 3-D modeling mask behavior simulation via emf (electromagnetic field) or photolithography simulation predicting resist contours. The process may be refined by calibration to real silicon for enhanced accuracy, as compared to a purely compact theoretical, physics-based model. Simulation may also take into account etch behavior, CMP behavior, or other semiconductor processes, thereby adding to the accuracy of the final design.

The Monte Carlo technique employed at step 405 may use a reduced set of simulated curves (i.e. nominal, upper and lower bound) in conjunction with interpolation. Interpolation, while not essential, will allow, with minimum loss to accuracy, for the generation of a sufficient number of trials for the Monte Carlo process within a practical time frame.

The incorporation of more accurate simulated curves, together with an interpolation technique in the Monte Carlo process, for design rule analysis as disclosed herein results in improved decision-making and final product quality. A Monte Carlo process may employ, for example, a known mathematical software program, such as Matlab.

In summary, the disclosed techniques determine a nominal condition in an inner and outer band and may interpolate between the inner and outer band with a Monte Carlo simulation. By using a PVBAND technique early in the process and combining this technique with a Monte Carlo technique, a technological improvement in terms of accuracy of assessment of design space is obtained.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and the drawings are accordingly to be regarded in an illustrative rather than restrictive sense.

What is claimed is:

1. A computer-implemented method, wherein at least one processor following a sequence of software instructions contained in a memory is caused to perform steps comprising:
   compiling, using the at least one processor, process assumptions regarding physical features on a semiconductor wafer, the physical features including wafer patterns;
   generating, responsive to the compiled process assumptions, modeling parameters to reflect expected process variation;
   generating, responsive to the modeling parameters, a predictive process contour of the wafer patterns, derived from a Process Variability Band (PVBAND) simulation;
   compiling data describing the predictive process contour of the wafer patterns into a cumulative distribution function (CDF) for key metrics by varying patterns and alignment between patterns a finite number of times, taking a nominal condition in an inner and outer band of the enhanced contours, interpolating between the inner and outer band, and running a statistical Monte Carlo algorithm using values of the varied patterns and alignment between patterns as inputs to the Monte Carlo algorithm to generate the CDF; and
   manufacturing a semiconductor circuit based on the CDF.

2. The method of claim 1 wherein the physical features comprise size and/or shape.

3. The method of claim 1, wherein the step of generating a predictive process contour is performed to reflect expected process variation in a manufacturing environment.

4. A computer-implemented process of designing semiconductor circuits, wherein at least one processor following a sequence of software instructions contained in a memory is caused to perform steps comprising
   establishing topological design rules (TDR);
   modeling, using the at least one processor, different scenarios for semiconductor circuit elements, in accordance with the topological design rules, using enhanced contours, derived from a Process Variability Band (PVBAND) simulation, representative of semiconductor circuit components; taking a nominal condition in an inner and outer band of the enhanced contours;
   Interpolating between the inner and outer band;
   iteratively evaluating, a finite number of times, each modeled scenario by randomly generating different sets of numbers for use as inputs to each modeled scenario using a Monte Carlo technique;
   deriving a distribution of key metrics from the evaluation step; and
   assessing the distribution of key metrics to determine what the implications are on the final design and ending the process when the implications are satisfactory.

5. The process of claim 4, wherein, when the implications are not satisfactory, running the process again with a new set of topological design rules.

6. The process of claim 5, wherein, after the iterative process has been satisfactorily completed, a semiconductor chip having the designed semiconductor circuit is manufactured.

7. A computer-implemented process of designing semiconductor circuits, wherein at least one processor following a sequence of software instructions contained in a memory is caused to perform steps comprising,
   establishing topological design rules (TDR);
   modeling, using the at least one processor, different scenarios for semiconductor circuit elements, in accordance with the topological design rules, using enhanced contours derived from a Process Variability Band (PVBAND simulation;
   deriving a distribution of key metrics by taking a nominal condition in an inner and outer band of the enhanced contours, interpolating between the inner and outer band, and applying a Monte Carlo to iteratively evaluate, a finite number of times, each modeled scenario by randomly generating different sets of numbers for use as inputs to each modeled scenario; and
   assessing the distribution of key metrics to determine what the implications are on the final design and ending the process when the implications are satisfactory.

* * * * *